US006844865B2

(12) United States Patent
Stasko

(10) Patent No.: US 6,844,865 B2
(45) Date of Patent: Jan. 18, 2005

(54) MULTIPLE SCREEN COMPUTER MONITOR

(76) Inventor: Michael Stasko, 1385 York Ave., Apt. #3D, New York, NY (US) 10021

( * ) Notice: Subject to any disclaimer, the term of this patent is extended or adjusted under 35 U.S.C. 154(b) by 57 days.

(21) Appl. No.: 10/235,112

(22) Filed: Sep. 4, 2002

(65) Prior Publication Data

US 2003/0001795 A1 Jan. 2, 2003

Related U.S. Application Data

(63) Continuation-in-part of application No. 09/481,232, filed on Jan. 11, 2000, now abandoned.
(60) Provisional application No. 60/147,983, filed on Aug. 9, 1999.

(51) Int. Cl.[7] .................................................. G09G 5/00
(52) U.S. Cl. ....................... 345/1.3; 345/905; 345/839; 345/840; 361/681; 361/682; 361/683
(58) Field of Search .......................... 345/1.3, 905, 1.1, 345/2.1, 2.2; 348/787, 794, 839, 840, 836, 843; 361/681–683, 724, 725, 727

(56) References Cited

U.S. PATENT DOCUMENTS

| | | | |
|---|---|---|---|
| 4,542,903 A | | 9/1985 | Yokoi et al. |
| 4,884,068 A | | 11/1989 | Matheny et al. |
| 4,920,458 A | | 4/1990 | Jones |
| 5,122,941 A | * | 6/1992 | Gross et al. ................. 362/276 |
| 5,128,662 A | | 7/1992 | Failla |
| 5,161,028 A | | 11/1992 | Kawata et al. |
| 5,467,102 A | | 11/1995 | Kuno et al. |
| 5,523,769 A | | 6/1996 | Lauer et al. |
| 5,537,127 A | | 7/1996 | Jingu |
| 5,612,741 A | | 3/1997 | Loban et al. |
| 5,654,776 A | | 8/1997 | Furuya |
| 5,673,170 A | * | 9/1997 | Register ...................... 361/681 |
| 5,687,939 A | * | 11/1997 | Moscovitch .............. 248/122.1 |
| D391,251 S | | 2/1998 | Yuyama et al. |
| D408,029 S | | 4/1999 | Rosen |
| 5,890,603 A | | 4/1999 | Arguin et al. |
| D409,597 S | | 5/1999 | Rosen |
| 6,061,104 A | * | 5/2000 | Evanicky et al. ........ 248/274.1 |
| 6,222,507 B1 | | 4/2001 | Gouko |
| 6,295,038 B1 | | 9/2001 | Rebeske |
| 6,343,006 B1 | | 1/2002 | Moscovitch et al. |

* cited by examiner

*Primary Examiner*—Henry N. Tran
(74) *Attorney, Agent, or Firm*—Morgan & Finnegan LLP; Mark J. Abate, Esq.

(57) ABSTRACT

A multiple screen computer monitor system comprising a plurality of monitors supported by a common base and connectable to a common CPU. One of the monitors is stationary on the base. The other two monitors are moveable from a storage position on the base to an operative position to the left and right, respectively, of the stationary monitor. Each of the moveable monitors has a rail transport system to transport the monitor from its storage position to its operative position. Another embodiment of the multiple screen computer monitor system includes two screens facing in the opposite direction to provide visual access for two different viewers sitting across the table from each other.

19 Claims, 14 Drawing Sheets

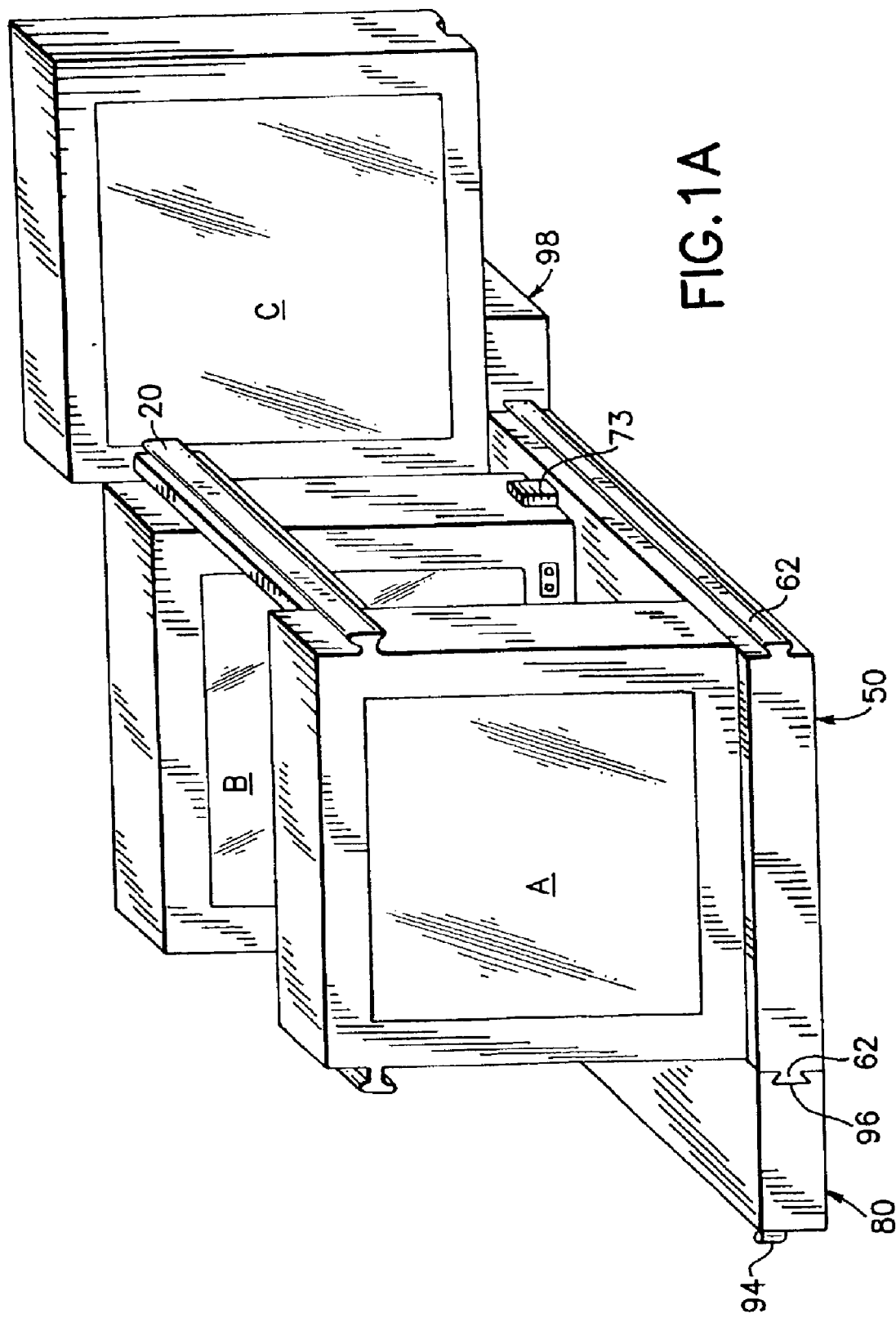

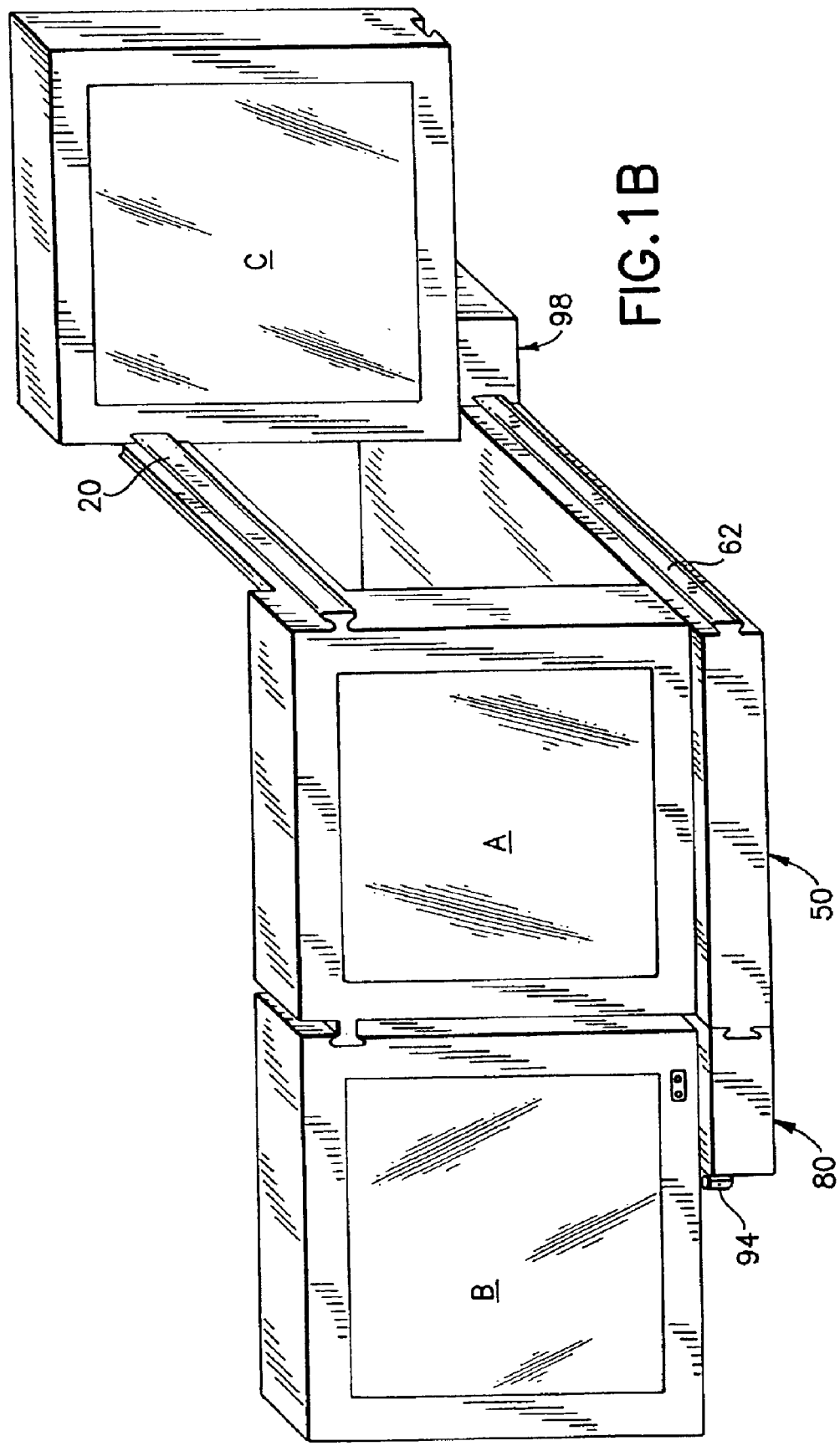

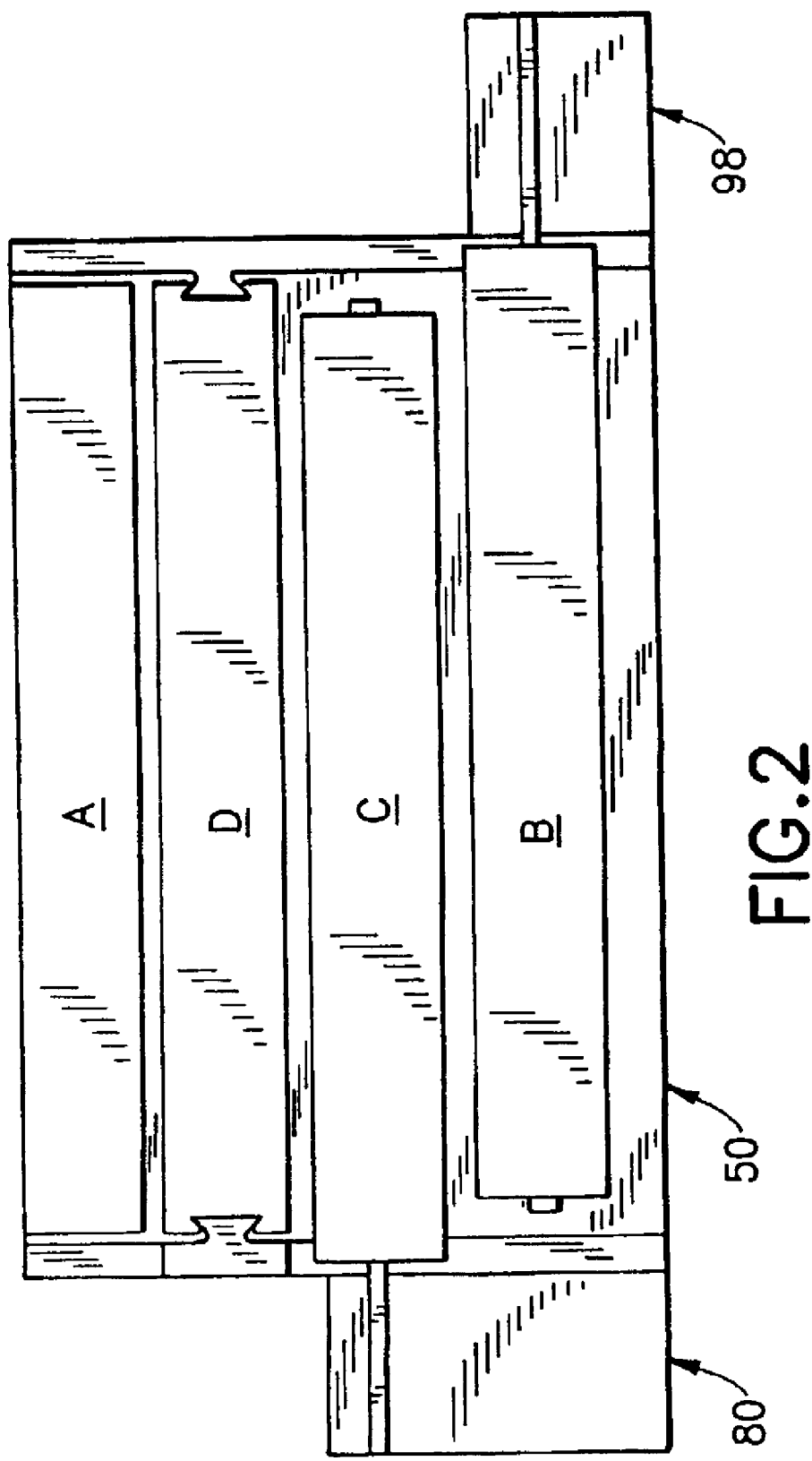

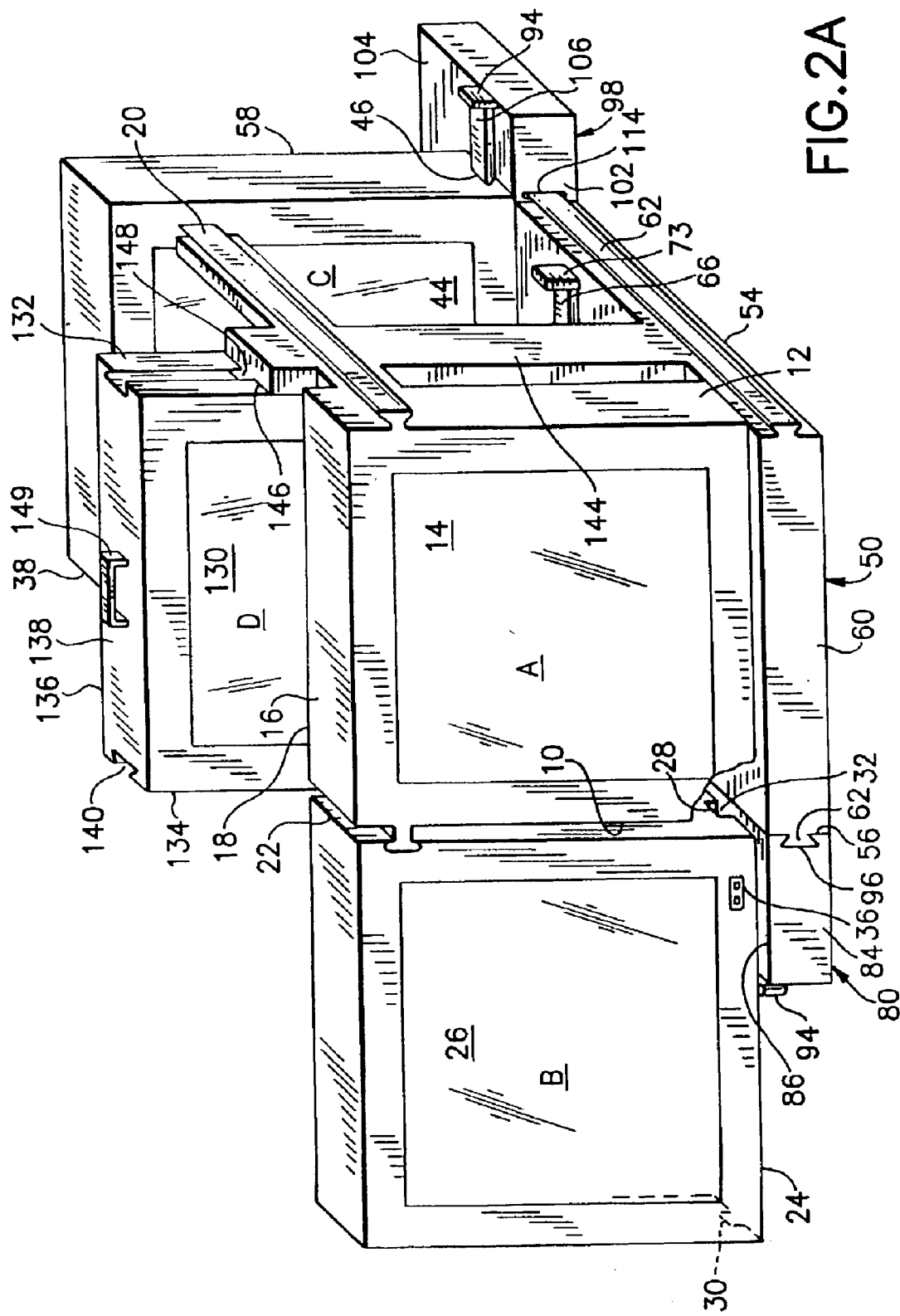

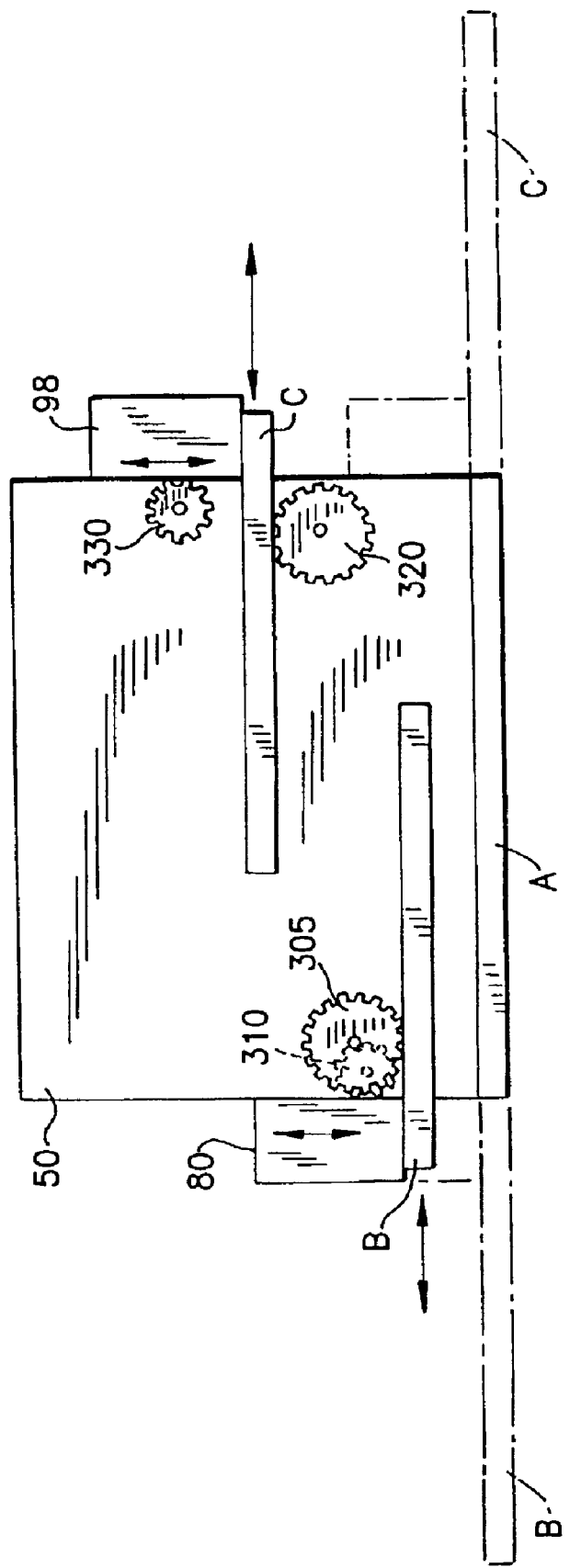

MULTIPLE SCREEN COMPUTER MONITOR

CROSS REFERENCE TO RELATED APPLICATIONS

This application claims the benefit of Provisional Application No. 60/147,983 filed Aug. 9, 1999.

This application is a continuation-in-part application and claims priority under 35 U.S.C. § 120 of U.S. patent application Ser. No. 09/481,232, filed on Jan. 11, 2000, which is abandoned on Feb. 24, 2003.

FIELD OF THE INVENTION

The present invention relates generally to a computer monitor for aiding a computer user to view a high volume of information, and more particularly, to a computer monitor having multiple screens.

BACKGROUND

A number of operating systems and internet browsers today enable a computer user to switch back and forth between spreadsheets, internet pages, documents, and/or various other applications. For example, most internet browsers have a "back" button to view the previous internet pages viewed. However, when a side by side comparison is desired, the application windows must be reduced in scale, splitting the viewing monitor in two and limiting the amount of information shown. The scroll bar is then required to move the document up or down, or to the right or left in order to view all of the information. This wastes time and is confusing to the viewer. Additionally, when two viewers are involved, each viewer may want to look at different types of information.

For example, the government and financial industry are notorious for involving enormous amounts of data to be viewed on computer screens. Stock analysts and traders often have several conventional monitors on a single desk, each monitoring numerous stock quotes and other financial data. Similarly, government workers and analysts, whether they are part of the Department of Defense, the Internal Revenue Service or some other agency, typically waste time switching between screens of information.

Thus, there exists a need for a computer screen system having multiple screens that enables a computer user to view a high volume of information, thereby increasing productivity.

SUMMARY OF INVENTION

The present invention solves these and other needs as apparent from the following description. One embodiment of the present invention features three monitors connectable to a common CPU. Generally speaking, one of the monitors is stationary on a base. The other two monitors are moveable from a storage position on the base to an operative positive to the left and right, respectively, of the stationary monitor. Each of the moveable monitors has a rail transport system to transport the monitor from its storage position to its operative position.

In another embodiment of the present invention, the present invention includes two screens facing in the opposite direction to provide visual access for two different viewers sitting across the table from each other.

BRIEF DESCRIPTION OF THE DRAWINGS

FIG. 1A is a perspective view of one embodiment of the present invention having three screens illustrating screen B in a storage position.

FIG. 1B is a perspective view of the embodiment shown in FIG. 1A illustrating screen B in an operative position.

FIG. 2 is a top view of one embodiment of the present invention illustrating the storage position for monitors B, C, and D.

FIG. 2A is a perspective view of one embodiment of the computer screen system illustrating four screens.

FIGS. 3A–3C are operational views illustrating the automation of the computer monitor system with the use of gears.

DETAILED DESCRIPTION OF CERTAIN EMBODIMENTS

I. Introduction

Figure 1C:
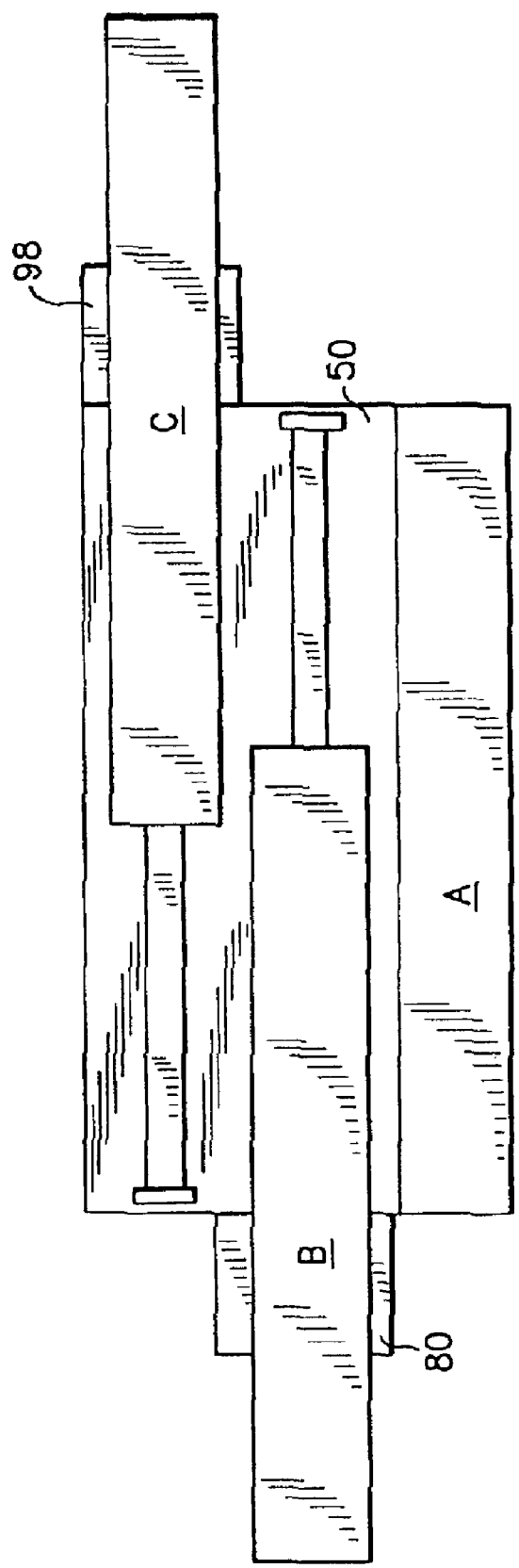
FIG. 1C is a top view of one embodiment of the present invention having three screens.

The present invention was developed to satisfy the needs of computer users having to view and compare a high volume of information. In one embodiment, the multiple screen monitor is adjustable from a storage position to an operative position to provide comfortable viewing by the computer user of a plurality of screens. For example, the multiple screen system of the present invention permits persons working in data intensive fields, such as the federal government or the financial industry, to view a high volume of information at the same time. One form of the multiple screen monitor includes three monitors, two of which are positioned to the right and left, respectively, of a stationary monitor. Thus, the multiple screen monitor provides a broader viewing surface which reduces the time wasted flipping between internet sites and between other applications. Preferably, each of the side monitors has a rail system for transporting it from the storage position to the operative position. Another embodiment of the multiple screen computer monitor includes screens facing in opposite directions to allow for viewing of the same or different information by multiple users. Thus, the multiple screen computer monitor reduces the cost and space associated with multiple computers.

II. The Embodiments of FIGS. 1A and 1B

One specific embodiment will now be described with reference to FIGS. 1A and 1B. In one embodiment, the multiple screen system comprises three monitors, monitor A, monitor B and monitor C, a base 50, a first transfer block 80, and a second transfer block 98. As described in detail below, monitor A remains stationary while monitors B and C transfer from the base 50 to the transfer blocks 80, 98, respectively. The transfer blocks 80,89, in turn, transfer to the front of the system. In the present embodiment, the monitors are LCD and, therefore, have thickness of less than one inch. Thus, it is to be understood that the figures provided are merely representative/illustrative and are not to scale.

Monitor A has an outer left side wall 10, an outer right side wall 12, a screen wall 14, a top wall 16 and a back wall 18. A rail member 20 is provided on the top of the outer left side wall 10 and extends a desired distance beyond the back wall 18. A rail member 20 is provided on the top of the outer right side wall 12 and extends a desired distance beyond the back wall 18. As will be described below, these rails 20 stabilize monitor B and C while in their operative positions.

Monitor B has an outer right side wall 22, a bottom wall 24, and a screen wall 26. A longitudinal channel 28 is provided in the bottom wall 24 extending the entire width of monitor B. The longitudinal channel 28 in the bottom wall 24 has a first end 30 and a second end 32. A longitudinal channel 34 is provided in the top of the outer right side wall 22 extending the entire depth of monitor B. A plug receiving member 36 is provided in the lower right corner of the screen wall 26. As described below, monitor B is moveable from a storage position to an operative position. The storage position of monitor B is behind monitor A. The operative position of monitor B is to the left of monitor A.

Monitor C has an outer left side wall 38, a bottom wall 40, and a screen wall 44. A longitudinal channel 46 is provided in the bottom wall 40 extending the entire width of monitor C. A longitudinal channel 48 is provided in the top of the outer left side wall 38 extending the entire depth of monitor C. A plug receiving member 36 is provided in the lower left corner of the screen wall 44. As described below, monitor C is moveable from a storage position to an operative position. The storage position of monitor C is behind monitor A. The operative position of monitor C is to the right of monitor A.

The base 50 has a top side 52, an outer right side wall 54, an outer left side wall 56, a back wall 58 and a front wall 60. A rail member 62 is provided on the outer right side wall 54 extending the entire depth of the base 50. The rail member 62 on the outer right side wall 54 is parallel to the rail member 20 on the top of the outer right side wall 12 of monitor A. A rail member 62 is provided on the outer left side wall 56 extending the entire depth of the base 50. The rail member 62 on the outer left side wall 56 is parallel to the rail member 20 on the outer left side wall 10 of monitor A. A rail member 66 for monitor B and a rail member 68 for monitor C are provided on the top side 52 of the base 50 and are parallel with respect to each other.

The rail member 66 for monitor B has a first end 70 and a second end 72. A stop 73 is provided at the second end 72 of the rail member 66. The rail member 66 for monitor B slidably engages the longitudinal channel 28 in the bottom wall 24 of monitor B. The stop 73 located at the second end 72 of the rail member 66 for monitor B prevents monitor B from sliding past the outer right side wall 54 of the base 50. Monitor B is also prevented from sliding past the outer right side wall 54 of the base 50 by a side wall supporting rail member 20 on the outer right side wall 12 of monitor A.

The rail member 68 for monitor C has a first end 74 and a second end 76. A stop 73 is provided at the second end 76 of the rail member 68. The rail member 68 for monitor C slidably engages the longitudinal channel 46 on the bottom wall 40 of monitor C. The stop 73 located at the second end 76 of the rail member 68 for monitor C prevents monitor C from sliding past the outer left side wall 56 of the base 50. Monitor C is also prevented from sliding past the outer left side wall 56 of the base 50 by a side wall supporting rail member 20 on the outer left side wall 10 of monitor A.

A first transfer block 80 has an outer right side wall 82, a front side 84 and a top side 86. A transfer rail 88 is provided on the top side 86. The transfer rail 88 has a first end 90 and a second end 92. A spring actuated stop 94 is provided at the second end 92 of the transfer rail 88. A longitudinal channel 96 is provided in the outer right side wall 82 of the first transfer block 80. The longitudinal channel 96 slidably receives the rail member 62 on the outer left side wall 56 of the base 50. The transfer rail 88 of the first transfer block 80 is parallel to the rail member 66 for monitor B on the top wall 52 of the base 50 and constructed to slidably engage the longitudinal channel 28 in the bottom wall 24 of monitor B.

A second transfer block 98 has an outer left side wall 100, a front side 102 and a top side 104. A transfer rail 106 is provided on the top side 104. The transfer rail 106 has a first end 108 and a second end 110. A spring actuated stop 94 is provided at the second end 110 of the transfer rail 106. A longitudinal channel 114 is provided in the outer left side wall 100. The longitudinal channel 114 slidably receives the rail member 62 on the outer right side wall 54 of the base 50. The transfer rail 106 of the second transfer block 98 is parallel to the rail member 68 for monitor C on the top wall 52 of the base 50 and constructed to slidably engage the longitudinal channel 46 in the bottom wall 38 of monitor C.

III. Operation of the Embodiment in FIGS. 1A and 1B

The operation of the specific embodiment described with reference to FIGS. 1A and 1B will now be described. A first rail system transports monitor B from its storage position to its operative position to the left of monitor A. The first rail system comprises the rail member 66 on the top side 52 of the base 50 for monitor B, the longitudinal channel 28 in the bottom wall 24 of monitor B, the transfer rail 88 on the first transfer block 80, the rail member 62 on the outer left side wall 56 of the base 50, the longitudinal channel 96 in the outer right side wall 82 of the first transfer block 80, the longitudinal channel 34 in the top of the outer right side wall 22 of monitor B and the rail member 20 on the outer left side wall 10 of monitor A.

The first transfer block 80 is positioned so that the first end 90 of the transfer rail 88 aligns with the first end 70 of the rail member 66 for monitor B by sliding the first transfer block 80 along the outer left side wall 56 of the base 50 by the engagement of the longitudinal channel 96 in the outer right side wall 82 of the first transfer block 80 and the rail member 62 on the outer left side wall 56 of the base 50. Monitor B is then slide to the left, beyond the first end 70 of the rail member 66 for monitor B, so that the longitudinal channel 28 of monitor B slidably receives the transfer rail 88 on the top wall 86 of the first transfer block 80. Monitor B is slide onto the first transfer block 80 until the second end 32 of the longitudinal channel 28 no longer rests on the top wall 52 of the base 50 and monitor B is entirely supported by the first transfer block 80. When the second end 32 of the longitudinal channel 28 is no longer resting on the top wall 52 of the base 50, the spring actuated stop 94 positioned at the second end 92 of the transfer rail 88 of the first transfer block 80 engages a recess in the longitudinal channel 28 in the bottom wall 24 of monitor B. The spring actuated stop 94 prevents monitor B from further sliding to the left on the first transfer block 80.

The longitudinal channel 34 in the outer right side wall 22 of monitor B slidably receives the rail member 20 on the outer left side wall 10 of monitor A. Rail member 20 extends to just before the screen wall 26 of monitor B when monitor B is first transferred to the transfer block 80 from the base 50. The engagement with the longitudinal channel 34 in the outer right side wall 22 of monitor B and the rail member 20 on the outer left side wall 10 of monitor A provides additional support for monitor B and prevents monitor B from rotating in a counterclockwise direction, in relation to the base 50, after monitor B is no longer supported by the base 50.

Monitor B is slide forward until the screen wall 26 of monitor B aligns, or is flush, with the screen wall 14 of monitor A. As monitor B is slide forward, the plug receiving member 36 of monitor B receives a plug member 116. Plug member 116 is connected to the CPU of the computer. This connection also serves to hold monitor B in its operative position by preventing the transfer block 80 from sliding away from the front wall 60 of the base 50.

A second rail system transports monitor C from its storage position to its operative position to the right of monitor A. The second rail system comprises the rail member 68 on the top side 52 of the base 50 for monitor C, the longitudinal channel 46 on the bottom side 40 of monitor C, the transfer rail 106 on the second transfer block 98, the rail member 62 on the outer right side wall 54 of the base 50, the longitudinal channel 114 in the outer left side wall 100 of the second transfer block 98, the longitudinal channel 48 in the top of the outer left side wall 36 of monitor C and the rail member 20 on the outer right side wall 12 of monitor A.

The second transfer block 98 is positioned so that the first end 108 of the transfer rail 106 aligns with the first end 74 of the rail member 68 for monitor C by sliding the second transfer block 98 along the outer right side wall 54 of the base 50 by the engagement of the longitudinal channel 114 of the second transfer block 98 and the rail member 62 on the outer right side wall 54 of the base 50. Monitor C is then slide to the right so that the longitudinal channel 46 of monitor C slidably receives the transfer rail 106 of the second transfer block 98. Monitor C is slide onto the second transfer block 98 until monitor C no longer rests on the top wall 52 of the base 50 and monitor C is entirely supported by the second transfer block 98. When monitor C is no longer supported by the top wall 52 of the base 50, the spring actuated stop 94 positioned at the second end 110 of the transfer rail 106 of the second transfer block 98 engages a recess in the longitudinal channel 46 in the bottom wall 40 of monitor C. The spring actuated stop 94 prevents monitor C from further sliding to the right on the second transfer block 98.

The longitudinal channel 48 in the outer left side wall 38 of monitor C slidably receives the rail member 20 on the outer right side wall 12 of monitor A. This rail member 20 extends as far as just before the screen wall 44 of monitor C when monitor C is first transferred to the second transfer block 98 from the base 50. The engagement of the longitudinal channel 48 in the outer left side wall 36 of monitor C and the rail member 20 on the outer right side wall 12 of monitor A provides additional support to monitor C and prevents monitor C from rotating in a clockwise direction, relative to the base 50, once monitor C is no longer supported by the base 50.

Monitor C then slides forward until the screen wall 44 of monitor C aligns, or is flush, with the screen wall 14 of monitor A. As monitor C is slide forward, the plug receiving member 36 of monitor C receives the plug member 116. Plug member 116 is connected to the CPU of the computer. This connection also serves to hold monitor C in its operative position by preventing the second transfer block 98 from sliding away from the front wall 60 of the base 50.

By connecting all of the monitors in the system to a common CPU, the user can open a current project on one monitor and use the other monitor for toolbars and secondary applications, or keep a Web browser open. There are a number of companies producing multi-monitor cards to enable a user to view applications or web browser on two or more monitors. Two companies on the internet, Colorgraphics (see www.colorgfx.com) and Appian (www.appian.com), describe multi-monitor cards that allow a plurality of monitors to be hooked up to the same CPU. Additionally, Microsoft® Windows 98, allows two video cards to be installed in the same CPU box to permit two or more monitors to be "linked" together as one monitor.

Figure 1D:
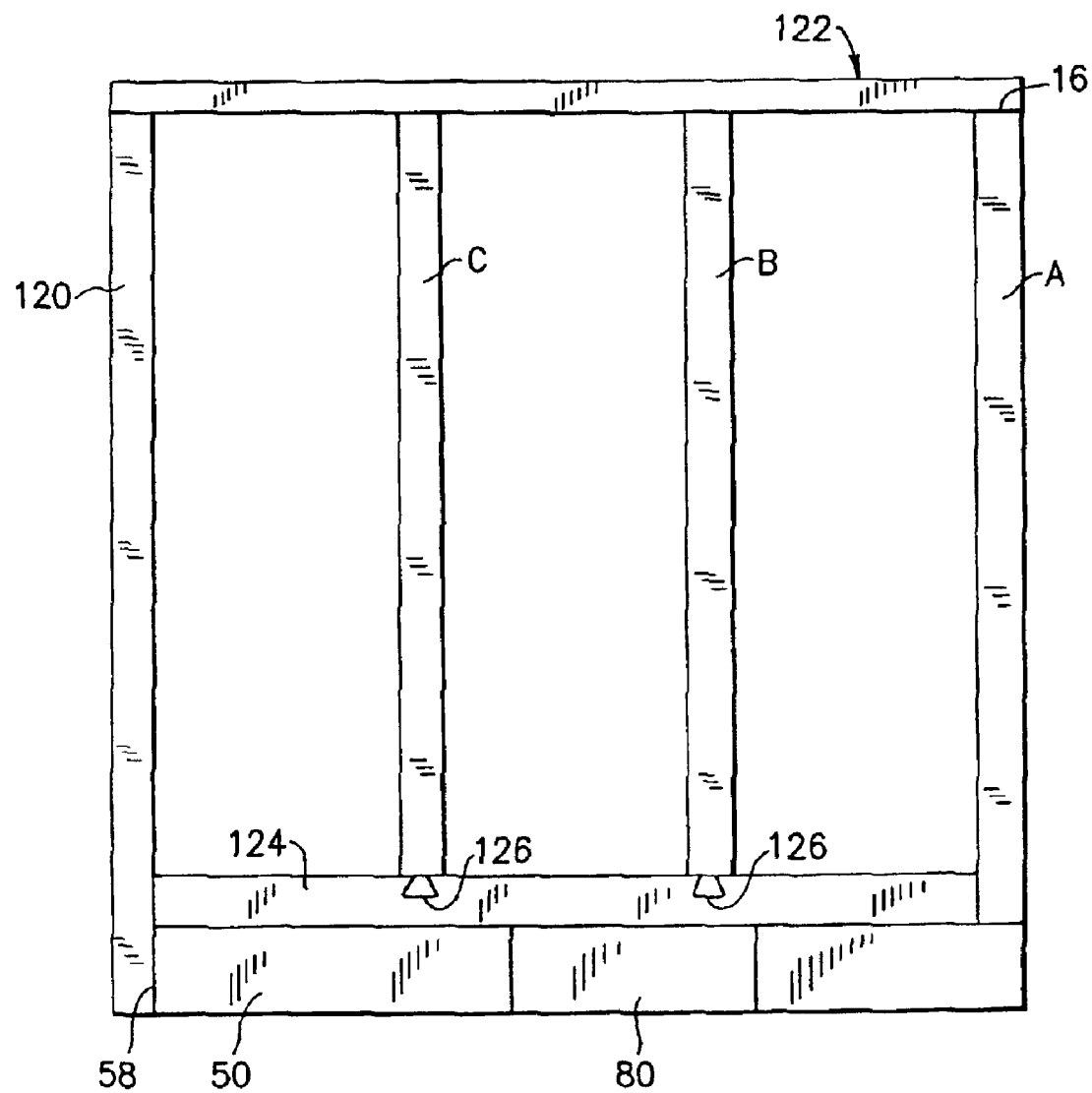
FIG. 1D is a simplified side view of one embodiment of the present invention having three screens.

In one embodiment, described with reference to FIGS. 1C and 1D, the multiple screen system includes a rear wall 120 and a housing 122. The rear wall 120 is attached to the back wall 58 of the base 50. The housing 122 attaches to the top wall 16 of monitor A and extends to the rear wall 120. The addition of the rear wall 120 and the housing 122 provides further support and stability to the multiple screen system while monitor B and C are in their storage positions.

The housing 122 includes a bottom wall 124 having two longitudinal channels 126 for slidably receiving monitors B and C. In alternate embodiments, the sides of the longitudinal channels 126 include rail members that are slidably received by longitudinal channels in the top of the front and back walls of monitors B and C. This prevents the monitors from swaying back and forth while in their storage positions.

In alternate embodiments, the housing 122 is a grated member or a thin member having a plurality of apertures for permitting ventilation of monitor A. When monitors B and C are in their storage positions, they are not connected to the CPU and not powered. However, Monitor A can be turned on and will require ventilation. Therefore, a housing 122 having a plurality of apertures or, alternatively, a fan mounted on the inside of the housing, is provided.

In alternate embodiments, the cables are connected to the back of the monitors and the monitors are held in their operative positions by other means such as a spring actuated stop, a hook and latch, or the like.

In alternate embodiments, the order and/or number of the fixed or moveable screens can be changed and the screens need not be symmetrical. For example, monitor A doesn't need to be stationary.

In alternate embodiments, the monitors are transported from their storage positions to their operative positions by other types of means. For example, the rail systems could include ball bearings, telescopical members, or the like.

IV. The Embodiments of FIGS. 2A and 2B

Figure 2B:
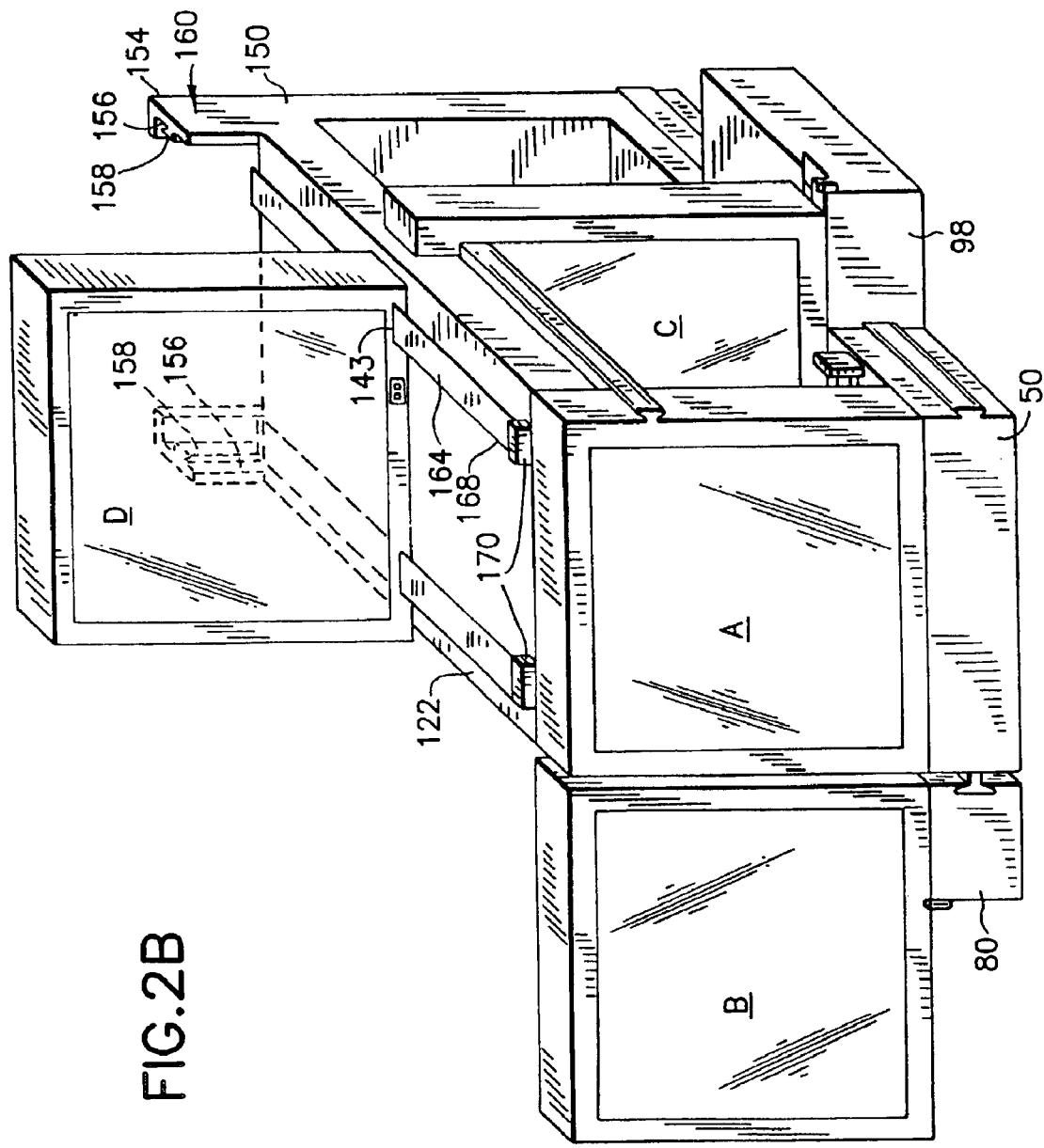
FIG. 2B is a perspective view of an alternate embodiment of the computer screen system illustrating the rear supports and housing system for monitor D.

Another specific embodiment will now be described with reference to FIGS. 2A and 2B. In another embodiment, a fourth monitor, monitor D, is provided to the multiple screen system. Monitor D has a screen wall 130, an outer right side wall 132, an outer left side wall 134, a back wall 136, a bottom wall 137 and a top wall 138. A longitudinal channel 140 is provided in the outer right side wall 132 extending the entire height of monitor D. A longitudinal channel 140 is provided in the outer left side wall 134 extending the entire height of monitor D. Monitor D is moveable from a storage position to an operative position. The storage position of monitor D is behind monitor A. The storage positions of monitor B, monitor C and monitor D are shown in FIG. 2. The operative position of monitor D is above monitor A. The bottom wall 137 of monitor D has two longitudinal channels 143 extending the entire depth of monitor C and perpendicular to the longitudinal channel 140 on the bottom wall 137.

One embodiment featuring monitor D includes the base 50 having side supports 144 extending from the top side 52 of the base 50 behind monitor A. Each side support 144 has an inner face 146 opposing the inner face 146 of the other side support 144. A rail member 148 protrudes from the inner face 146 of each side support 144 and extends the entire height of each side support 144. The rail members 148 on the inner faces 146 of the side supports 144 slidably engage the longitudinal channels 140 provided in the outer side walls 132, 134, respectively, of monitor D.

Monitor D is transported to its operative position by the engagement of the slide members 148 on the side supports 144 and the longitudinal channels 140 in the outer side walls 132, 134, respectively, of monitor D. Monitor D is lifted straight up by a handle 149 attached to the top wall 138 of monitor D. Once monitor D has reached its operative position, a stop means (not shown) holds monitor D in place. The stop means engages monitor D and prevents it from falling down towards the top wall 52 of the base 50.

In another embodiment featuring the construction of monitor D as described above, the rear wall 120, the housing 122 and two rear side supports 150 are used to transport monitor D to its operative position above monitor A. The rear side supports 150 are substantially L-shaped and extend a desired distance above the housing 122. Each rear side support 150 has a first end 152 and a second end 154, and an inner face 156 opposing the inner face 156 of the other rear side support 150. A rail member 158 protrudes from the inner face 156 of each rear side support 150 extending from the first end 152 to a distance even with the housing 122. The remaining portion of the inner face 156 above the housing 122 is smooth. The rail member 158 on the inner face 156 of the rear side support 150 slidably engage the longitudinal channel 140 provided in the outer side walls 132, 134, respectively, of monitor D. The rear side supports 150 have a guide member 160 to prevent monitor D from falling backwards.

The housing 122 includes a top surface 162 having two parallel rail members 164 extending the entire length of the housing 122. Each of the slide members 164 have a first end 166 and a second end 168. A stop member 170 is provided at the second end 168 of the rail members 164.

V. The Operation of the Embodiment in FIGS. 2A and 2B

The operation of the specific embodiment illustrated by FIGS. 2A and 2B will now be described. Monitor D is transported to its operative position by the engagement of the rail members 158 on the rear side supports 150 and the longitudinal channels 140 in the outer side walls 132, 134, respectively, of monitor D. Monitor D is lifted straight up by a handle 149 attached to the top wall 138 of monitor D. Once the bottom wall 137 of monitor D has been lifted above the rail members 158 on the inner faces 156 of the rear side supports 150, the longitudinal channels 143 in the bottom wall 137 are slidably engaged with the two rail members 164 on the top 162 of the housing 122. The guide members 160 of the rear side supports 150 prevent monitor D from falling backwards and aid in aligning the longitudinal channels 143 in the bottom wall 137 of monitor D with the rail members 143 on the housing 122. The monitor then slides forward on the rail members 164 on the housing 122 until the screen wall 130 of monitor D is stopped by the stop members 170 at the second end 168 of the slide members 164.

As monitor D reaches its operative position, a plug receiving member 36 located in the bottom of the screen wall 130 of monitor D receives a plug member 116 positioned, preferable, on one of the stop members 170 of the slide members 164 on the housing 122. The plug member 116 is attached to the CPU. This engagement connects monitor D to the CPU which powers and controls the monitor and also prevents monitor D from sliding backwards.

VI. The Structure and Operation of the Embodiment in FIG. 2C

Figure 2C:
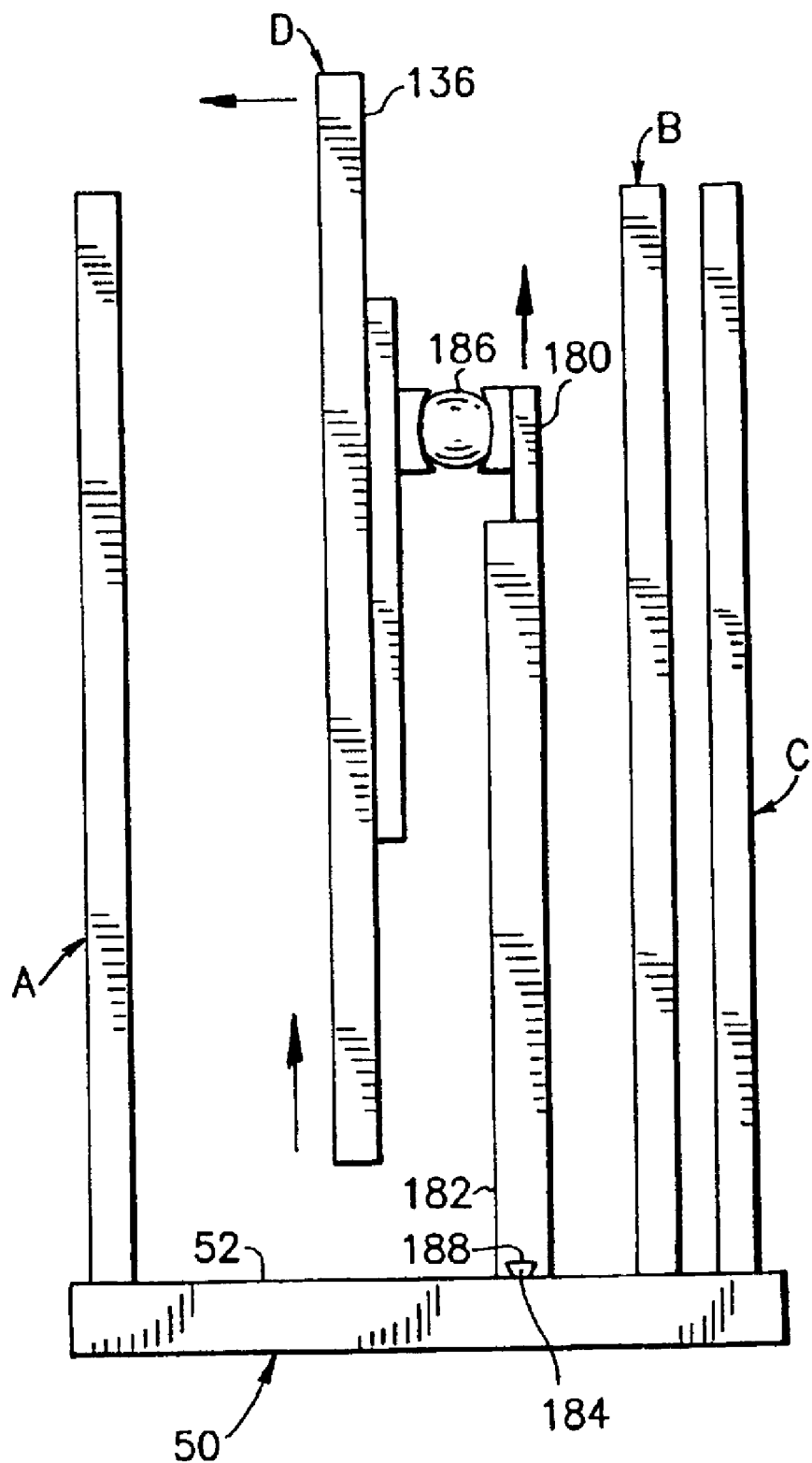
FIG. 2C is a simplified side view of an alternate embodiment of the computer monitor system including monitor D.

Another specific embodiment will now be described with reference to FIG. 2C. In another embodiment featuring a fourth monitor, monitor D is transported to its operative position by a first support member 180 having a first end and a second end, a second support member 182 having a first end and a second end, and a rail member 184 on the top wall 52 of the base 50. Monitor D is attached on its back wall 136 to the first support member 180. Monitor D is adjustable relative to the first support member 180 by pivotable means 186. The pivotable means 186 includes a ball and socket joint. The first end of the first support member 180 is telescopically slidably received by the first end of the second support member 182. A longitudinal channel 188 is provided in the second end of the second support member 182. The rail member 184 on the top wall 52 of the base 50 is disposed perpendicular to the slide members 66, 68 for monitors B and C, respectively. The rail member 184 slidably engages the longitudinal channel 188 of the second support member 182.

Thus, when monitor D is in its storage position, the first support member 180 will reside within the second support member 182. Conversely, when the first support member 180 is pulled out to its fully extended position, the second end of the first support member 180 will extend a desired distance beyond the first end of the second support member 182. The maximum distance to which the second end of the first support member 180 may travel out of the second support member 182 is governed by a latching mechanism (not shown) disposed within the second support member 182. The latching mechanism prevents the entire first support member 180 from being pulled out of the second support member 182. In the present embodiment, the latching mechanism is a spring actuated stop 94, as described above. When the first support member 180 reaches its maximum distance out of the second support member 182, the spring actuated stop 94 engages a hole in the first support member 180 which prevents the first support member 180 from sliding any further.

Once the first support member 180 reaches its maximum distance out of the second support member 182, monitor D is moved forward to its operative position over monitor A by the slidably engagement of the rail member 184 on the top wall of the base with the longitudinal channel 188 in the second end of the second support member 182. In its operative position, monitor A can be pivoted by the pivotable means 186.

VII. The Structure and Operation of the Embodiment of FIG. 2D

Figure 2D:
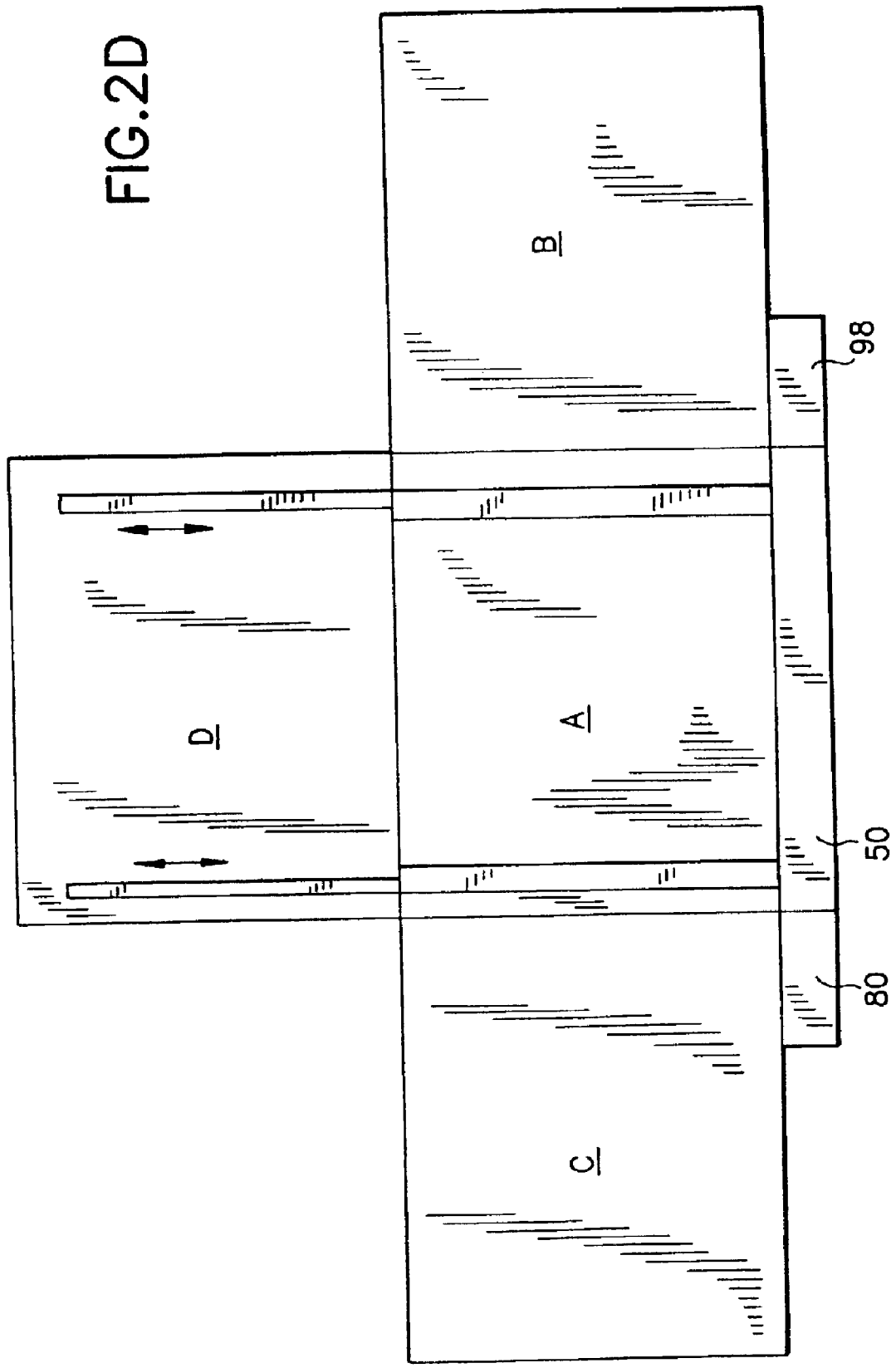
FIG. 2D is a simplified back view of an alternate embodiment of the computer screen system including monitor D.

Another specific embodiment will now be described with reference to FIG. 2D. In another embodiment featuring monitor D, monitor D is transported to its operative position by two rear support systems attached to the back wall of monitor D and the top wall of the base. The two rear support systems each have a first rear support member and a second rear support member. Specifically, the first rear support member is telescopically slidably disposed within the second rear support member. Each of the rear support members have a first end and a second end. Thus, when monitor D is in its storage position, the first rear support members will reside within the second rear support member. Conversely, when monitor D is pulled out to its operative position above monitor A, the second end of the first rear support members will extend a desired distance beyond the first end of the second rear support member. The two rear support members are spaces apart on the back wall of monitor D to provide stability when monitor D is lifted and held in its operative position.

The maximum distance to which the first end of the first rear support member may travel out of the second rear support member is governed by a latching mechanism disposed within the second rear support member. The latching mechanism prevents the entire first rear support member from being pulled out of the second rear support member. In the present embodiment, the latching mechanism is a spring actuated stop. The spring actuated stop has a top end that is either rounded or slanted to permit the first support member to slide over it. When the first rear support member reaches its maximum distance out of the second rear support member, the spring actuated stop engages a hole in the first rear support member which prevents the first rear support member from sliding any further.

VIII. The Embodiments of FIGS. 3A through 3C

Figure 3B:
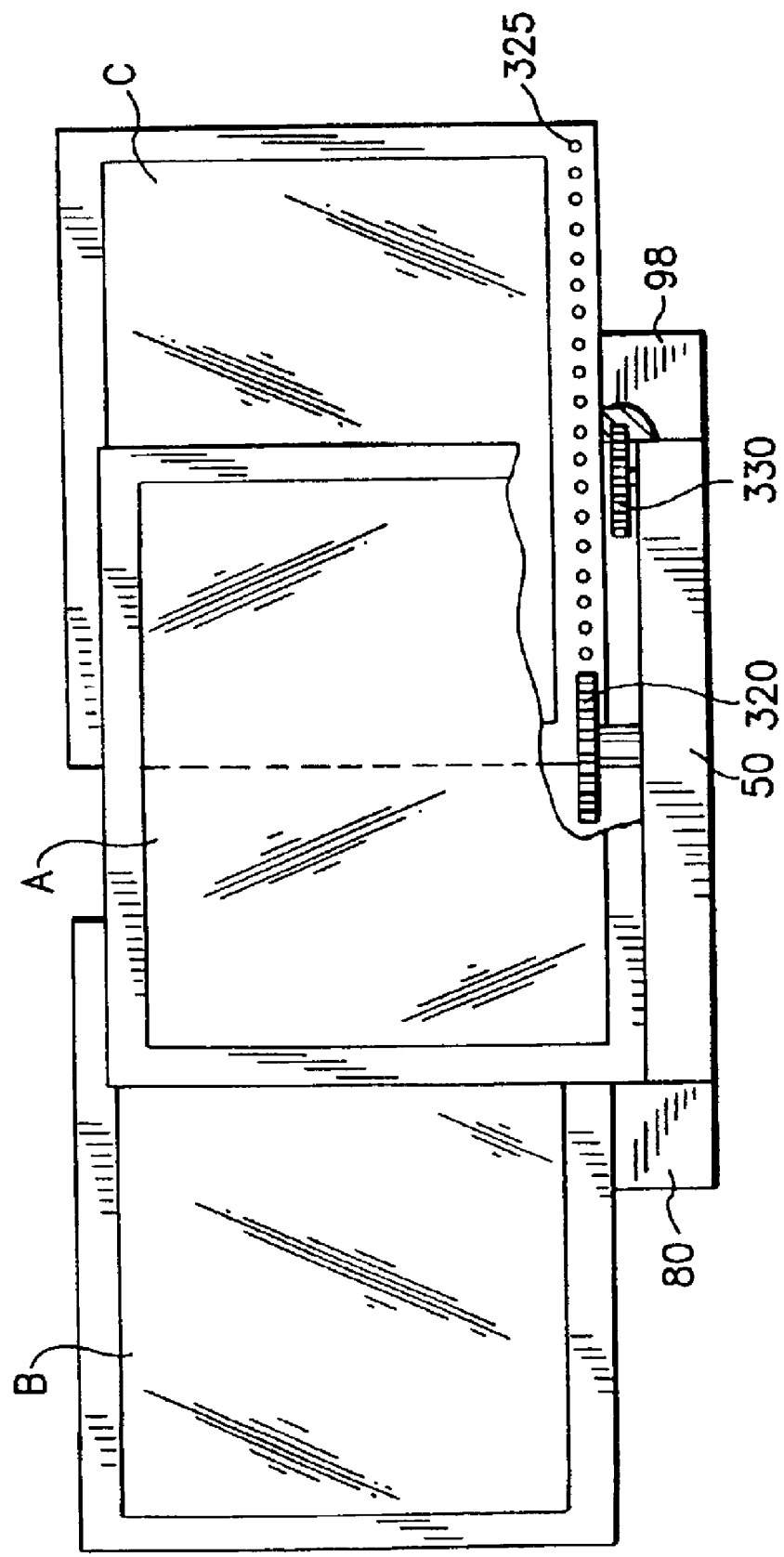
Figure 3C:
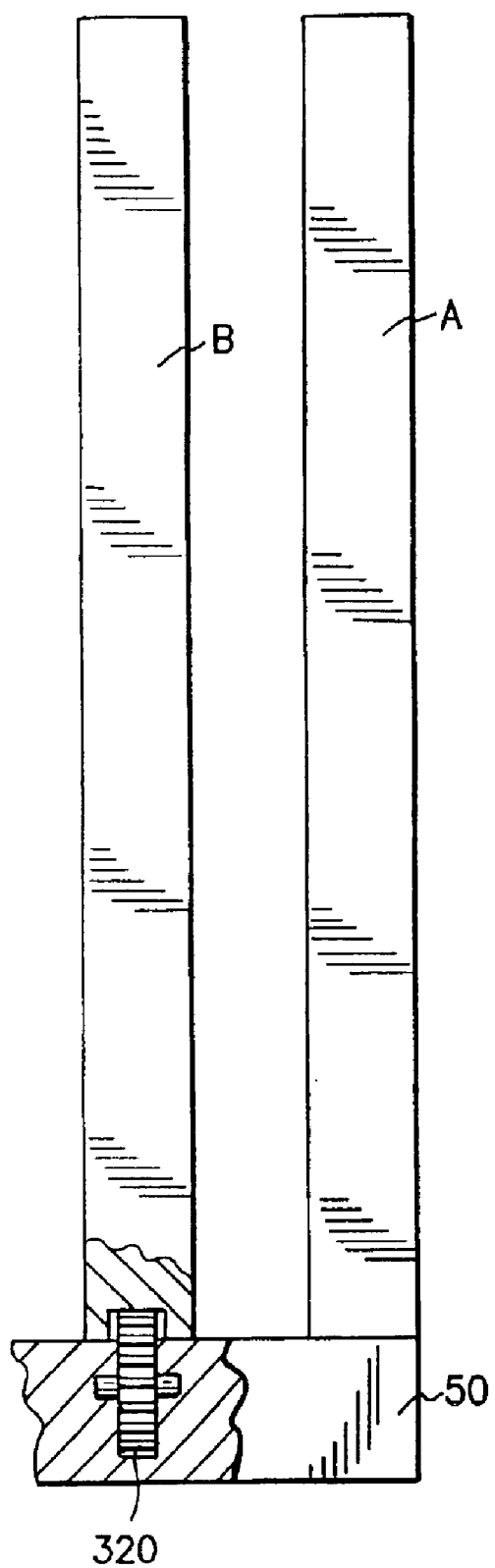

Another specific embodiment will now be discussed with reference to FIGS. 3A through 3C. In another embodiment of the multiple monitor system, the transportation of monitors B, C, and D are automated, e.g. motorized, and controlled by a control system. The automation of the transportation of the monitors is achieved through the use of gears, although other means such as pulleys or the like may be used. The gears are positioned in relation to the slide members of the system to aid in sliding the monitors and/or transfer blocks to the desired positions.

In automating the first rail system for monitor B, the first rail system further includes two gears 305, 310, each having a plurality of teeth. The first gear 305 is positioned on the top wall 52 of the base 50 towards the outer left side wall of the base 50. The bottom of the back wall or screen wall of monitor B has a plurality of holes for receiving the teeth of the first gear 305. The second gear 310 is positioned on the outer left side wall of the base 50. The first transfer member 80 has a plurality of holes under or above the longitudinal channel for receiving the teeth of the second gear 310.

When activated, the first gear 305 turns and the teeth of the first gear 305 engage the holes in monitor B. As the first gear rotates in a clockwise direction, monitor B is forced to slide to the left on the rail member 66 on the top wall of the base 50 and is transferred to the transfer rail on the first transfer block 80. When monitor B has been transferred to the first transfer block 80, the second gear 310 is activated. As the second gear 310 rotates in a counterclockwise direction, the first transfer block 80 is forced to slide forward towards the front wall of the base 50. When monitor B reaches its operative position, a locking mechanism is provide to keep the first transfer block from sliding backwards, away from the front wall of the base.

Similar use of gears can be used for the second rail system for transporting monitor C and the system for transporting the monitor D to their operative positions. For example, gear 320 engages holes 325 in monitor C and gear 330 aids in moving second transfer block 98.

IX. The Embodiment of FIGS. 4A and 4B

Figure 4A:
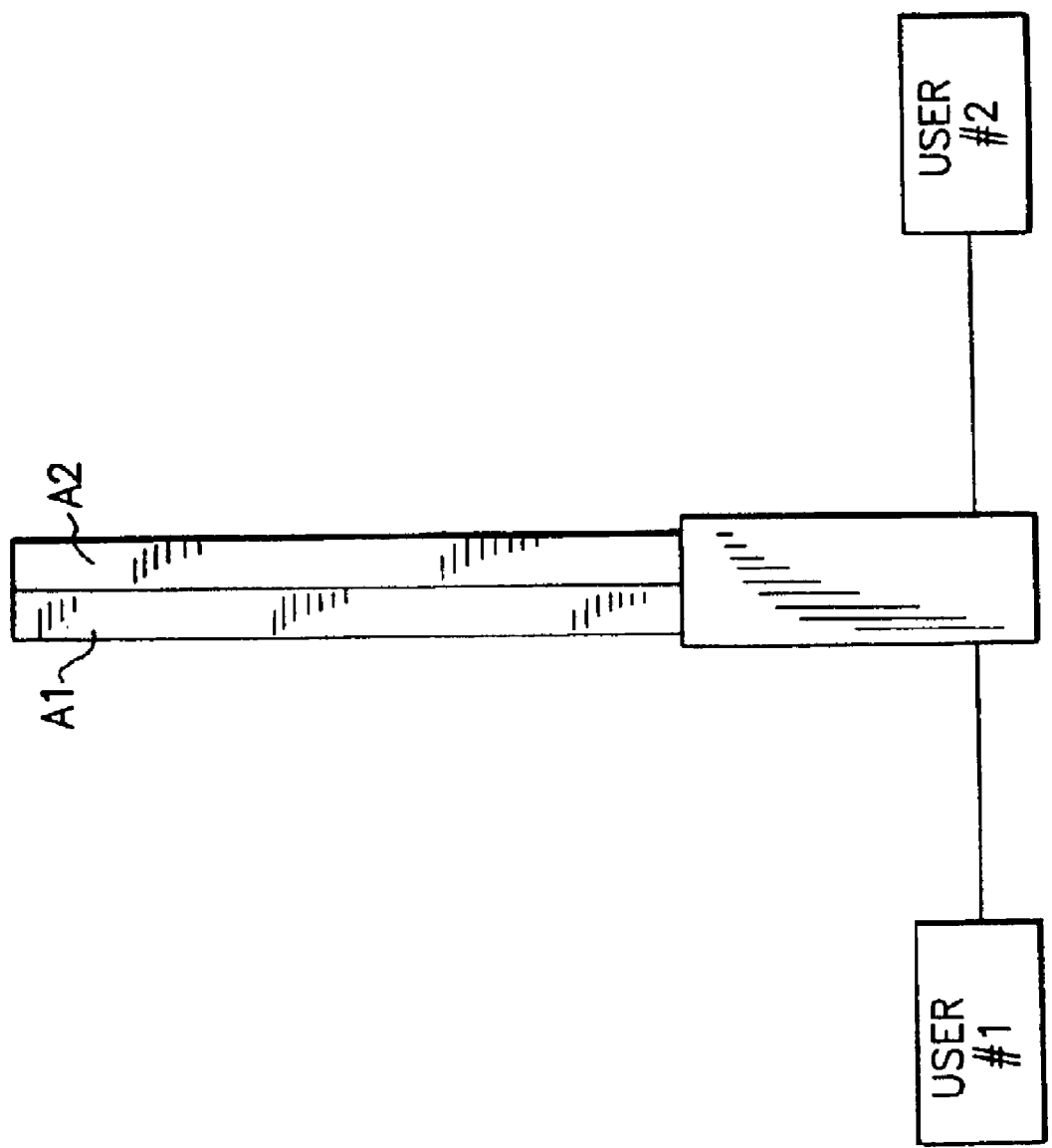
FIG. 4A is a side view of one embodiment of the present invention having a dual vision screen.
Figure 4B:
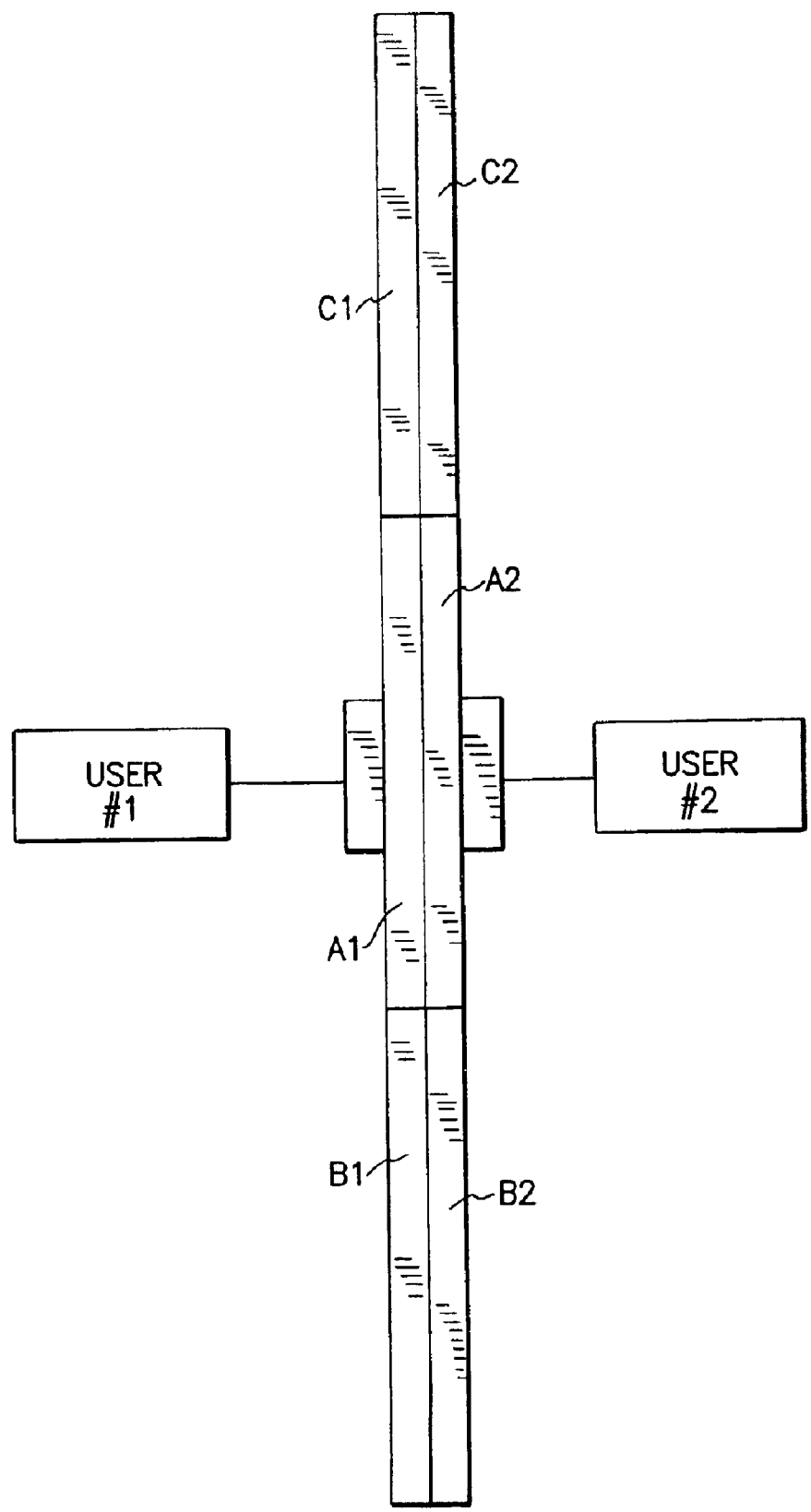
FIG. 4B is a top view of one embodiment of the present invention having a plurality of dual vision screens.

Another specific embodiment will now be discussed with reference to FIGS. 4A and 4B. In an alternate embodiment, the multiple screen system includes two screens facing in the opposite direction to provide visual access for two different viewers sitting across the table from each other. This embodiment is configured to permit the two users to view and interact with the same information and programs or different information and programs.

The multiple screen system of this embodiment includes monitor A1 and monitor A2. Monitor A1 and monitor A2 each have an outer right side wall, an outer left side wall, a screen wall, and a back wall. The back walls of monitor A1 and monitor A2 are facing each other.

The multiple screen system of this embodiment can alternatively include additional monitors, similar to the preferred embodiment. The multiple screen system comprising opposing monitors A1 and A2 further includes monitor B1, monitor B2, monitor C1, and monitor C2, and conceivably monitor D1 and monitor D2. The positioning and operation of the multiple screen system of this embodiment having additional monitors is constructed and operated similar to the multiple monitor screen systems described above.

When back-to-back monitors are employed, the multiple screen computer monitors of FIGS. 1 and 3 could have up to six monitors (i.e. A1 and A2, B1 and B2 and C1 and C2, each mounted back-to-back and the multiple screen computer monitor of FIG. 2 could have up to 8 monitors (i.e. A1 and A2, B1 and B2, C1 and C2 and D1 and D2, each mounted back-to-back).

In another embodiment, the multiple system includes three monitors. Monitor A is stationary. When the multiple monitor system of this embodiment is in the operative position, monitor B3 is positioned to the left of monitor A and monitor C3 is positioned to the right of monitor A. Conversely, when the multiple monitor system of this embodiment is in the storage position, both monitor B3 and monitor C3 are disposed behind monitor A.

Monitor B3 and monitor C3 are moved from their storage positions to their operative positions by pivotable means. The pivotable means are attached to the top or bottom walls of monitors B3, C3. In operation, monitors B3 and C3 are moved to their operative positions in the same manner as opening a book or a lap top.

In one embodiment, the CPU is housed within the base. In other embodiments, the CPU is a separate tower unit or part of any of the monitors.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

What is claimed is:

1. A multiple screen computer monitor system comprising:
   at least two monitor housings;
   each monitor housing having two monitors facing in opposite directions along a common longitudinal axis to allow viewing by multiple users;
   the monitor housings including at least one fixed monitor housing and at least one movable monitor housing; and
   a rail transport system in communication with the movable monitor housing to transport the movable monitor housing to the sides of the fixed monitor housing such that the movable monitor housing is adjacent to the sides of the fixed monitor housing.

2. The system of claim 1, wherein the monitors are connectable to a common CPU.

3. The system of claim 2, wherein the CPU is a separate tower unit.

4. The system of claim 2, wherein the CPU is housed within a base attached to the fixed monitor housing.

5. The system of claim 2, wherein the monitors are connected in a manner that maintains the connection to the CPU.

6. The system of claim 1, configured to permit the users to view and interact with the same information and programs.

7. The system of claim 1, configured to permit the users to view and interact with different information and programs.

8. The system of claim 1, wherein the fixed monitor housing and moveable monitor housing are attached together when the moveable monitor housing is moved adjacent to the sides of the fixed monitor housing.

9. The system of claim 1, wherein the fixed monitor and at least one of the moveable monitors receive and display information.

10. The system of claim 9, wherein the information is programs or other applications.

11. A multiple screen computer monitor system comprising:
- a first monitor housing for housing monitors facing in opposite directions along a common longitudinal axis to allow veiwing by mulitple users, having a front, a back, and sides;
- at least one second monitor housing for housing monitors facing in opposite directions along a common longitudinal axis to allow viewing by multiple users, each of the second monitor housings movable from a storage position to an operative position and connectable to a CPU common to the monitor in the first monitor housing, wherein each of the second monitor housing is behind the first monitor housing while in the storage position; and
- a rail transport system in communication with the second monitor housing to transport the second monitor housing to the sides of the first monitor housing such that the second monitor housing are adjacent to the sides of the first monitor housing.

12. The system of claim 11, wherein the first monitor housing has a front profile, and wherein each of the second monitor housings is completely behind the first monitor housing so that the only the front profile of the first monitor housing is viewed by a user while the second monitor housings are in the storage position.

13. The system of claim 11, wherein the rail transport system further comprising a first rail system for moving one of the second monitor housings from the storage position to the operative position.

14. The system of claim 11, wherein a first rail system includes a transfer block for transferring one of the second monitor housings from the base to the operative position.

15. The system of claim 11, wherein the rail transport system further comprising a second rail system for moving another of the second monitor housings from the storage position to the operative position.

16. The system of claim 15, wherein a first rail system includes a transfer block for transferring the another of the second monitor housings from the base to the operative position.

17. A multiple screen computer system comprising:
- a first monitor housing for monitors facing in opposite directions along a common longitudinal axis to allow viewing by multiple users, having a front, a back, and sides;
- at least one second monitor housing for housing monitors facing in opposite directions along a common longitudinal axis to allow viewing by multiple users, said second monitor housing movable from a storage position to an operative position and connectable to a CPU common to the monitors in the first in the first monitor housing, wherein said second monitor housing is behind the first monitor housing while in the storage position; and
- a rail transport system in communication with said second monitor housing to transport said second monitor housing to the sides of said first monitor housing such that the second monitor housing is adjacent to the sides of said first monitor housing.

18. A multiple screen computer system comprising:
- a first monitor housing for housing monitors facing in opposite directions along a common longitudinal axis to allow viewing by multiple users, having a front, a back, and sides, and at least one second monitor housing for housing monitors facing in opposite directions along a common longitudinal axis to allow viewing by multiple users, the monitors in the first monitor housing and the monitors in the second monitor housing connectable to a common CPU; and
- means for moving the second monitor housing from a storage position to an operative position, wherein each of said second monitor housings is behind the first monitor housing while in the storage position, said moving means in communication with said second monitor housing to transport said second monitor housing to the sides of said first monitor housing such that the second monitor housing is adjacent to the sides of said first monitor housing.

19. A multiple screen computer system comprising
- a plurality of monitor housings for housing monitors facing in opposing directions along a common longitudinal axis to allow viewing by multiple users, said monitor housings having at least one fixed monitor housing and at least one movable monitor housing such that said monitors in said monitor housings are connectable to a common CPU; and
- a rail transport system in communication with said movable monitor housing to transport said movable monitor housing to the sides of said fixed monitor housing such that the movable monitor housing is adjacent to the sides of said fixed monitor housing.

* * * * *